(12) United States Patent
Lambert et al.

(10) Patent No.: US 10,599,523 B2
(45) Date of Patent: Mar. 24, 2020

(54) SYSTEMS AND METHODS FOR ENHANCED ROM ACCESS RESILIENCY

(71) Applicant: Dell Products L.P., Round Rock, TX (US)

(72) Inventors: Timothy M. Lambert, Austin, TX (US); Michael J. Stumpf, Cedar Park, TX (US); Ronald Paul Rudiak, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 116 days.

(21) Appl. No.: 15/801,879

(22) Filed: Nov. 2, 2017

(65) Prior Publication Data

US 2019/0129801 A1 May 2, 2019

(51) Int. Cl.
| | | |
|---|---|---|
| *G06F 11/14* | (2006.01) | |
| *G06F 1/24* | (2006.01) | |
| *G06F 13/42* | (2006.01) | |

(52) U.S. Cl.
CPC ............ *G06F 11/1441* (2013.01); *G06F 1/24* (2013.01); *G06F 13/4282* (2013.01); *G06F 2201/805* (2013.01)

(58) Field of Classification Search
CPC ............................... G06F 11/1441; G06F 1/24
See application file for complete search history.

(56) References Cited

U.S. PATENT DOCUMENTS

| | | | | |
|---|---|---|---|---|
| 5,522,034 A | * | 5/1996 | Watari | G01R 31/007 307/10.7 |
| 6,766,417 B1 | * | 7/2004 | Tanaka | G11C 7/16 711/102 |
| 9,948,411 B2 | * | 4/2018 | Diperna | H04B 17/11 |
| 2001/0018717 A1 | * | 8/2001 | Shimotono | G06F 9/441 719/319 |
| 2003/0200382 A1 | * | 10/2003 | Wells | G06F 1/30 711/106 |
| 2004/0019759 A1 | * | 1/2004 | Adelman | G06F 21/79 711/173 |
| 2004/0123165 A1 | * | 6/2004 | Wierzbicki | G06F 1/24 713/300 |
| 2008/0068470 A1 | * | 3/2008 | Lee | G06F 1/266 348/231.7 |
| 2008/0215841 A1 | * | 9/2008 | Bolotin | G06F 1/1632 711/164 |
| 2014/0006855 A1 | * | 1/2014 | Niwa | G06F 11/1469 714/15 |

(Continued)

*Primary Examiner* — Yolanda L Wilson
(74) *Attorney, Agent, or Firm* — Jackson Walker, L.L.P.

(57) ABSTRACT

An information handling system may include at least one processor, a management controller, a serial peripheral interface (SPI) read-only memory (ROM), and at least one logic device. The management controller may be communicatively coupled to the at least one processor and configured to provide out-of-band management of the information handling system. The logic device may be configured to reset the SPI ROM in response to an indication that the SPI ROM is to be reset, and the resetting may include detaching the SPI ROM from a SPI controller, disconnecting a power source from the SPI ROM, in response to a passage of a particular amount of time, reconnecting the power source to the SPI ROM, and re-attaching the SPI ROM to the SPI controller.

16 Claims, 3 Drawing Sheets

(56) References Cited

U.S. PATENT DOCUMENTS

2014/0032601 A1* 1/2014 Kanigicherla ........ G06F 16/176
                                                           707/781
2015/0149825 A1* 5/2015 Lucas ................. G06F 11/1402
                                                            714/22

* cited by examiner

SYSTEMS AND METHODS FOR ENHANCED ROM ACCESS RESILIENCY

TECHNICAL FIELD

The present disclosure relates in general to information handling systems, and more particularly to methods and systems for resetting a component of an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In the course of operation, various information handling resources (e.g., components of an information handling system) may become crashed, hung, or otherwise failed. The ability to reset such information handling resources may thus increase the operational reliability of information handling systems.

As one example, serial peripheral interface (SPI) read-only memories (ROMs) are a type of information handling resource on which many functions rely. In some embodiments, a SPI ROM may itself be a component of an information handling resource within an information handling system. A SPI ROM may control various aspects of data storage and code execution in such an information handling resource. In various embodiments, such SPI ROMs may be programmable ROMs (PROMs), erasable programmable ROMs (EPROMs), or electrically erasable programmable ROMs (EEPROMs). For sake of clarity and exposition, all such variants are referred to simply as SPI ROMs herein.

A SPI ROM may encounter various types of failure modes. For example, hardware-based malfunctions may be caused by spurious power or ground noise transients. Further, a device that is being operated beyond the limits of its specifications may operate marginally, experiencing partial or total failure.

Other malfunctions may be caused by software or firmware issues. For example, a SPI ROM may receive incorrect opcodes that put it into the wrong operating mode (e.g., quad I/O width when the bus is only configured for single I/O), or undocumented opcodes that put it into a diagnostic or test mode. As another example, an incorrect clock frequency change beyond the device's specifications may also cause a failure. As yet another example, a SPI ROM may contain a defect in its internal firmware that can cause instability or malfunctions.

When a SPI ROM enters a failure mode, it may be advantageous to be able to reset it. Although such a reset may be accomplished by resetting the entire information handling system (or information handling resource) that comprises the SPI ROM, doing so may not always be desirable. In particular, in some embodiments, it may be desired to leave most of such a system functional and/or leave an auxiliary power enabled while in the process of resetting the SPI ROM.

Unfortunately, the SPI ROM may not include an input specifically useable for causing a full reset. Thus it may be desirable to cause a more complete reset than what is available via the standard SPI ROM inputs.

This disclosure provides various techniques that may be employed in these and other situations.

SUMMARY

In accordance with the teachings of the present disclosure, the disadvantages and problems associated with resetting information handling resources may be reduced or eliminated.

In accordance with embodiments of the present disclosure, an information handling system may include at least one processor, a management controller, a serial peripheral interface (SPI) read-only memory (ROM) and at least one logic device. The management controller may be communicatively coupled to the at least one processor and configured to provide out-of-band management of the information handling system. The logic device may be configured to reset the SPI ROM in response to an indication that the SPI ROM is to be reset, and the resetting may include detaching the SPI ROM from a SPI controller of the SPI ROM, disconnecting a power source from the SPI ROM, and in response to a passage of a particular amount of time, reconnecting the power source to the SPI ROM, and re-attaching the SPI ROM to the SPI controller of the SPI ROM.

In these and other embodiments, a method may include receiving, at a logic device, an indication that a SPI ROM is to be reset. The method may further include in response to the indication, the logic device detaching the SPI ROM from a SPI controller of the SPI ROM, disconnecting a power source from the SPI ROM, the logic device waiting a particular amount of time, the logic device reconnecting the power source to the SPI ROM, and the logic device re-attaching the SPI ROM to the SPI controller of the SPI ROM.

In these and other embodiments, a ROM reliability controller may include a programmable logic device (PLD) configured to be coupled to a management controller of an information handling system. The information handling system may include at least one SPI ROM, and the management controller may be configured to provide out-of-band management of the information handling system. The PLD may be configured to reset the SPI ROM in response to an indication that the SPI ROM is to be reset. The resetting may include detaching the SPI ROM from a SPI controller of the SPI ROM, disconnecting a power source from the SPI ROM, in response to a passage of a particular amount of time, reconnecting the power source to the SPI ROM, and re-attaching the SPI ROM to the SPI controller of the SPI ROM.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
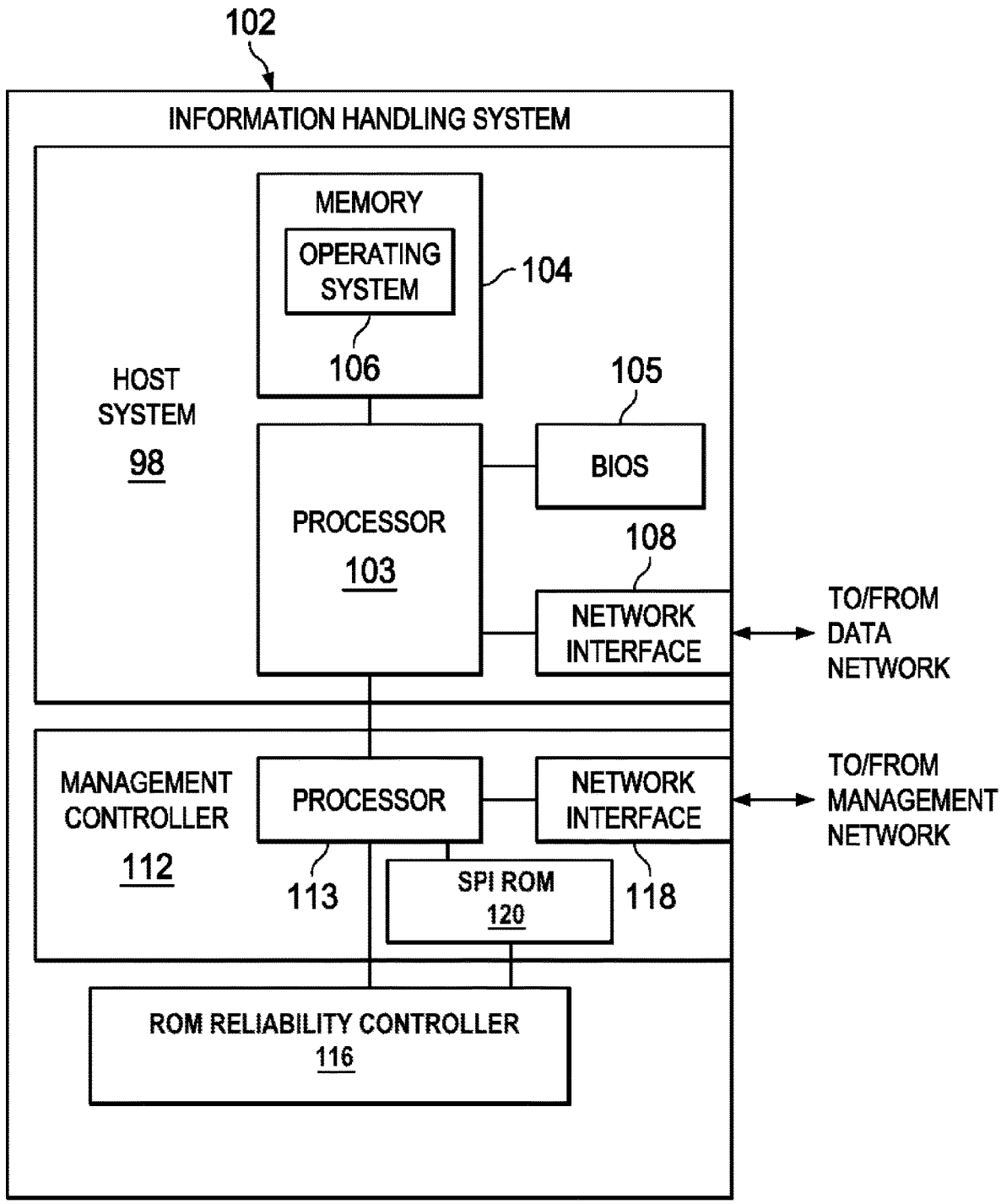
FIG. 1 illustrates a block diagram of an example information handling system, in accordance with embodiments of the present disclosure.
Figure 2:
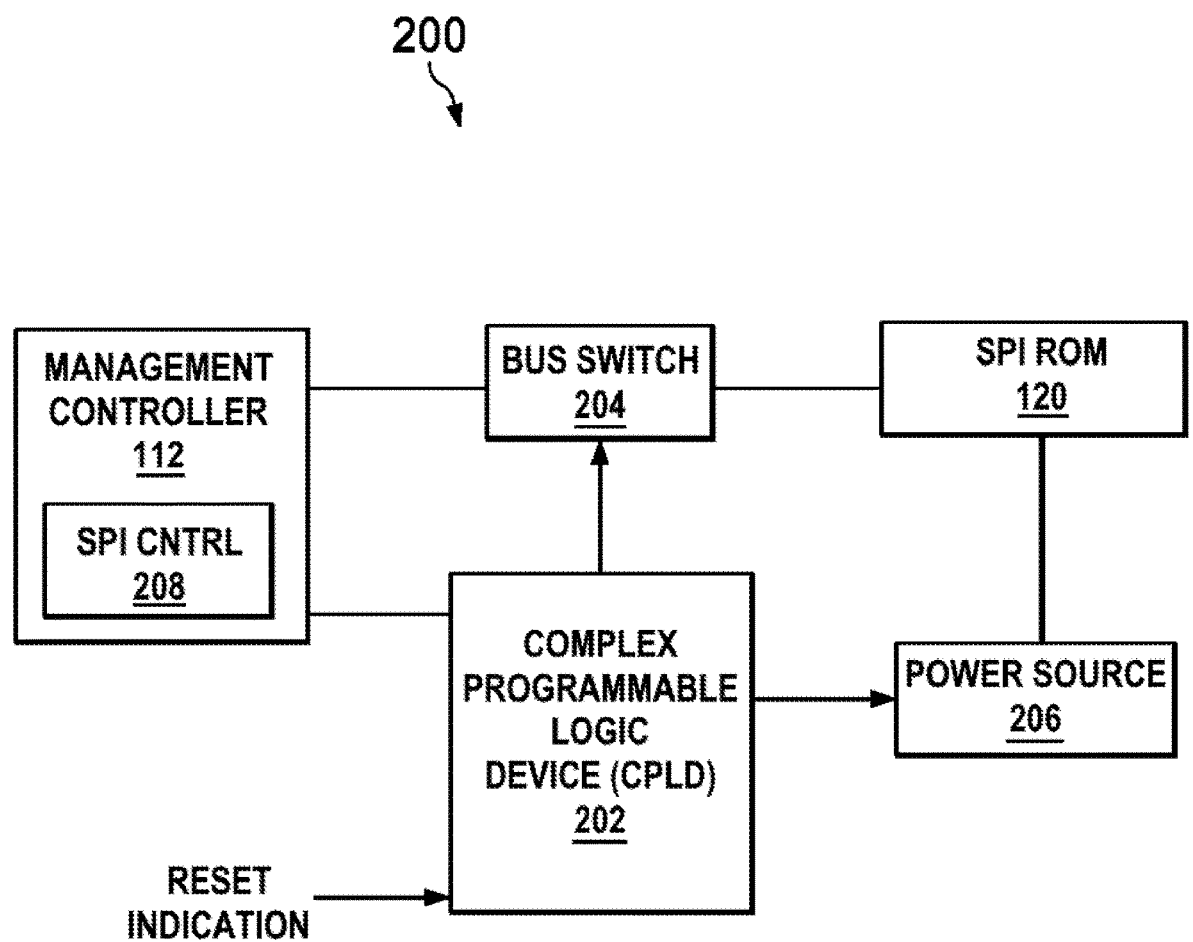
FIG. 2 illustrates a block diagram of an example device, in accordance with embodiments of the present disclosure.
Figure 3:
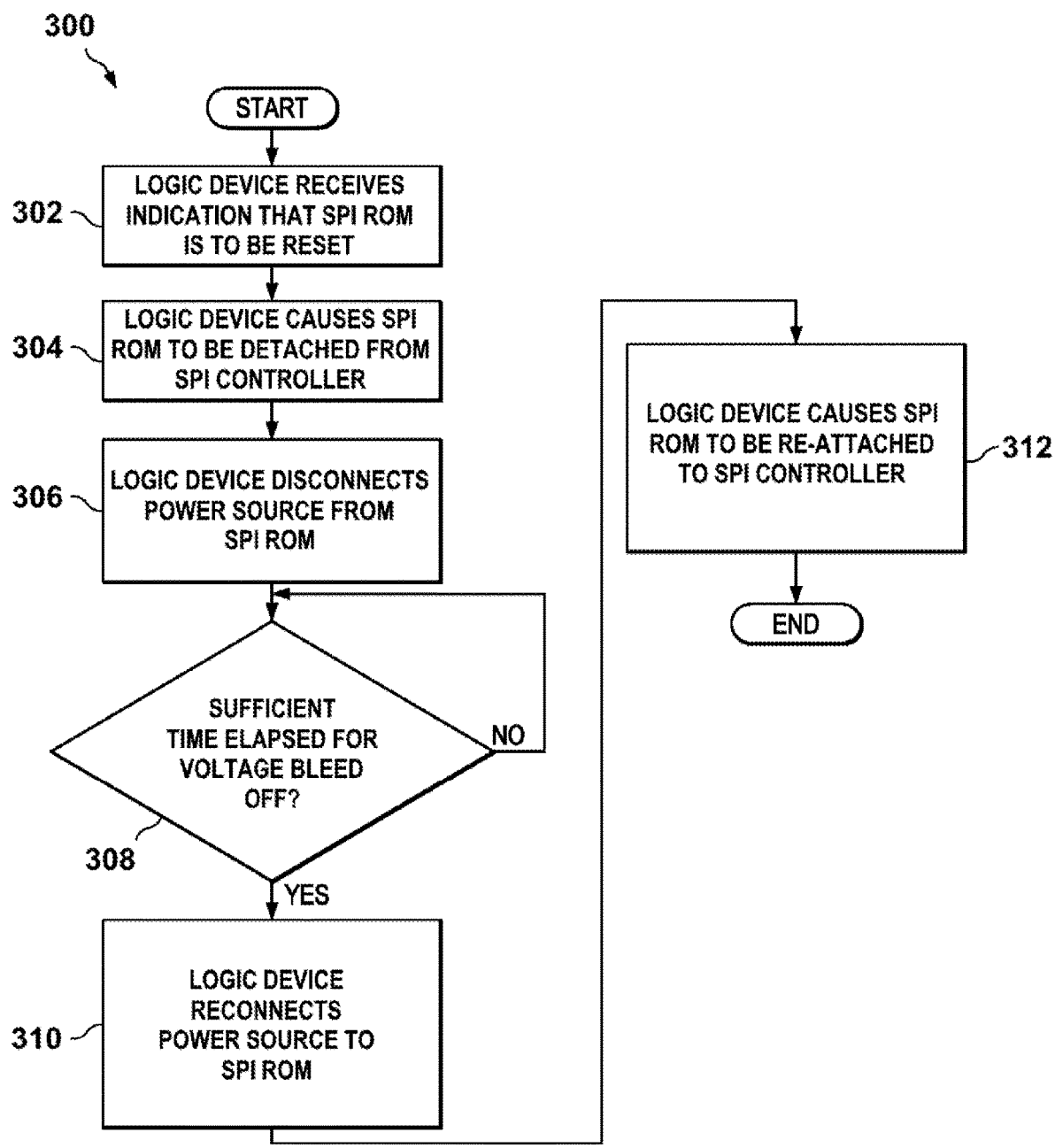
FIG. 3 illustrates a flow chart of an example method for resetting a device, in accordance with embodiments of the present disclosure.

Preferred embodiments and their advantages are best understood by reference to FIGS. 1 through 3, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media (e.g., transitory or non-transitory computer-readable media) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems, buses, memories, I/O devices and/or interfaces, storage resources, network interfaces, motherboards, and/or any other components and/or elements of an information handling system.

FIG. 1 illustrates a block diagram of an example information handling system 102. In some embodiments, information handling system 102 may comprise a personal computer. In some embodiments, information handling system 102 may comprise or be an integral part of a server. In other embodiments, information handling system 102 may comprise a portable information handling system (e.g., a laptop, notebook, tablet, handheld, smart phone, personal digital assistant, etc.). As depicted in FIG. 1, information handling system 102 may include a processor 103, a memory 104 communicatively coupled to processor 103, a BIOS 105 communicatively coupled to processor 103, a network interface 108 communicatively coupled to processor 103, a management controller 112 communicatively coupled to processor 103, and a ROM reliability controller 116 communicatively coupled to a processor 113.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions, or aggregation of programs of executable instructions, configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

A BIOS 105 may include any system, device, or apparatus configured to identify, test, and/or initialize information handling resources of information handling system 102, and/or initialize interoperation of information handling system 102 with other information handling systems. "BIOS" may broadly refer to any system, device, or apparatus configured to perform such functionality, including without limitation, a Unified Extensible Firmware Interface (UEFI). In some embodiments, BIOS 105 may be implemented as a program of instructions that may be read by and executed on processor 103 to carry out the functionality of BIOS 105. In these and other embodiments, BIOS 105 may comprise boot firmware configured to be the first code executed by processor 103 when information handling system 102 is booted and/or powered on. As part of its initialization functionality, code for BIOS 105 may be configured to set components of information handling system 102 into a known state, so that one or more applications (e.g., an operating system or other application programs) stored on compatible media (e.g., disk drives) may be executed by processor 103 and given control of information handling system 102.

Network interface 108 may comprise any suitable system, apparatus, or device operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

In operation, processor 103, memory 104, BIOS 105, and network interface 108 may comprise at least a portion of a host system 98 of information handling system 102.

Management controller 112 may be configured to provide management facilities for management of information handling system 102. Such management may be made by management controller 112 even if information handling system 102 and/or host system 98 are powered off or powered to a standby state. Management controller 112 may include a processor 113, memory, and a management network interface 118 separate from and physically isolated from data network interface 108. In certain embodiments, management controller 112 may include or may be an integral part of a baseboard management controller (BMC), a chassis management controller (CMC), or a remote access controller (e.g., a Dell Remote Access Controller or Integrated Dell Remote Access Controller). As shown in FIG. 1, management controller 112 may comprise a processor 113 and a network interface 118 communicatively coupled to processor 113.

Management controller 112 may include SPI ROM 120. SPI ROM 120 may include any suitable data or program instructions usable in the operation of management controller 112. For example, SPI ROM 120 may be a boot ROM for management controller 112. It is to be noted that although SPI ROM 120 is shown as a component of management controller 112 in this embodiment, in other embodiments, a SPI ROM according to this disclosure may be an element of some other information handling resource of information handling system 102. In yet other embodiments, a SPI ROM according to this disclosure may be considered an information handling resource of information handling system 102 itself, without being a portion of some other information handling resource thereof.

Processor 113 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 113 may interpret and/or execute program instructions and/or process data stored in a memory and/or another component of information handling system 102 or management controller 112, e.g., SPI ROM 120. As shown in FIG. 1, processor 113 may be communicatively coupled to processor 103. Such coupling may be via a Universal Serial Bus (USB), System Management Bus (SMBus), and/or one or more other communications channels.

Network interface 118 may comprise any suitable system, apparatus, or device operable to serve as an interface between management controller 112 and one or more other information handling systems via an out-of-band management network. Network interface 118 may enable management controller 112 to communicate using any suitable transmission protocol and/or standard. In these and other embodiments, network interface 118 may comprise a network interface card, or "NIC."

In addition to processor 103, memory 104, network interface 108, management controller 112, and ROM reliability controller 116, information handling system 102 may include one or more other information handling resources.

Although FIG. 1 depicts information handling system 102 as only having a single host system 98 for the purposes of clarity and exposition, in some embodiments, information handling system 102 may comprise a server rack including a plurality of racks of host systems 98.

ROM reliability controller 116 may be coupled to SPI ROM 120 and processor 113 and may comprise any suitable system, device, or apparatus configured to receive an indication that SPI ROM 120 has entered a failure state. For example, ROM reliability controller 116 may be implemented as a hardware logic device. For example, a logic device such as a programmable logic device (PLD) or a complex programmable logic device (CPLD) may be used. ROM reliability controller 116 may be configured to determine whether SPI ROM 120 is in need of a reset, and to cause such a reset when it is needed.

In some embodiments, ROM reliability controller 116 may periodically poll SPI ROM 120 to ensure that it is operating properly. In other embodiments, ROM reliability controller 116 may be configured to receive an indication (e.g., from processor 113) that SPI ROM 120 has entered a failure state. An indication that SPI ROM 120 has entered a failure state may also include an indication that SPI ROM 120 is to be reset.

In general, such an indication may be received from any source internal or external to information handling system 102, and it may be generated by hardware, firmware, or software. As a few examples, reset indications may include a detection that AC power has recently been applied to information handling system 102, a physical button press, a core reset or power-on reset for processor 113, a power-on reset for management controller 112, etc.

In response to receiving an indication that SPI ROM 120 is to be reset, ROM reliability controller 116 may undertake various actions to bring SPI ROM 120 back to an operable state. For example, ROM reliability controller 116 may disconnect a power source from SPI ROM 120. Then, after a suitable amount of time has passed to allow for voltage bleed off (e.g., 10 milliseconds in some embodiments), ROM reliability controller 116 may reconnect the power source to SPI ROM 120.

In some embodiments, SPI ROM 120 may include a file system (e.g., a file system used by management controller 112). In these and other embodiments, ROM reliability controller 116 may also cause additional actions to be taken in the process of resetting SPI ROM 120. For example, such a file system may be unmounted prior to the disconnection of the power source. Further, after the power source is reconnected, such a file system may be remounted for use by management controller 112. In this way, in some embodiments, SPI ROM 120 may be reset without any down time for management controller 112.

Additionally, in some embodiments, ROM reliability controller 116 may interface with a SPI controller (not shown) that is configured to control SPI ROM 120. Such an interface between ROM reliability controller 116 and the SPI controller may allow ROM reliability controller 116 to indicate to the SPI controller that any accesses of SPI ROM 120 should be delayed until sufficient time has passed to allow SPI ROM 120 to be fully restarted. In this way, for example, ROM reliability controller 116 may ensure that the first data access after SPI ROM 120 is reset succeeds reliably.

Turning now to FIG. 2, a detailed block diagram of an example embodiment of an implementation of ROM reliability controller 116 is shown at system 200.

System 200 includes management controller 112 from FIG. 1, which may include SPI controller 208. Management controller 112 is coupled via bus switch 204 to SPI ROM 120. SPI ROM 120 is powered via power source 206, which may be a power field effect transistor (FET) configured to convert an auxiliary power into the voltage needed by SPI ROM 120. CPLD 202 in this embodiment is shown as a logic device configured to manage the reset of SPI ROM 120.

For example, CPLD 202 may receive a reset indication for SPI ROM 120 from any of various sources as discussed elsewhere. In this embodiment, CPLD 202 may indicate to management controller 112 that SPI ROM 120 will be unavailable for a period of time, and further may cause bus switch 204 to disconnect SPI ROM 120 from management controller 112. CPLD 202 may then cause power source 206 to be disconnected from SPI ROM 120 (e.g., by shutting down power source 206).

After a desired period of time has elapsed (e.g., to allow the voltage at SPI ROM 120 to bleed off), CPLD 202 may reverse this process. That is, CPLD 202 may cause power source 206 to be reconnected to SPI ROM 120. CPLD 202 may further cause bus switch 204 to reconnect management controller 112 to SPI ROM 120 and may indicate to management controller 112 that SPI ROM 120 is now available for use.

Turning now to FIG. 3, a flow chart of an example method 300 is shown for resetting a SPI ROM of an information handling system, in accordance with certain embodiments of the present disclosure. According to some embodiments, method 300 may begin at step 302. As noted above, teachings of the present disclosure may be implemented in a variety of configurations, such as within the context of information handling system 102.

At step 302, a logic device receives an indication that a SPI ROM is to be reset. This indication may be based on a variety of criteria, some of which are discussed above. For example, the SPI ROM may have entered a failure state such as a hang.

At step 304, based on the indication that the SPI ROM is to be reset, the logic device causes the SPI ROM to be detached from a SPI controller. For example, the SPI ROM may be logically detached without the need for a physical detachment.

At step 306, based on the indication that the SPI ROM is to be reset, the logic device causes a power source to be disconnected from the SPI ROM. In some instances, the logic device may take further actions before doing so (e.g., dismounting a ROM file system, etc.).

At step 308, the logic device waits until sufficient time has elapsed for the voltage being supplied to the SPI ROM to bleed off to a negligible level. The amount of time required at this step may be dependent upon the specifics (e.g., capacitances) of the SPI ROM itself and/or the system of which it is a part. For some typical systems, 10 milliseconds may be considered sufficient. In some embodiments, the logic device may be configurable as to the amount of time to wait.

At step 310, once sufficient time has passed, the logic device reconnects the power source to the SPI ROM and allows it to come back online.

At step 312, the logic device causes the SPI ROM to be re-attached to the SPI controller. In some cases, the logic device may also further coordinate with the SPI controller to cause any requested accesses to the SPI ROM to be deferred until after the completion of method 300 (e.g., until after sufficient time has elapsed following step 312 to allow for the SPI ROM to become fully functional again). After step 312, method 300 ends.

Although FIG. 3 discloses a particular number of steps to be taken with respect to method 300, method 300 may be executed with greater or lesser steps than those depicted in FIG. 3. In addition, although FIG. 3 discloses a certain order of steps to be taken with respect to method 300, the steps comprising method 300 may be completed in any suitable order.

Method 300 may be implemented using information handling system 102 or any other system operable to implement method 300. In certain embodiments, method 300 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:
   at least one processor;
   a management controller communicatively coupled to the at least one processor and configured to provide out-of-band management of the information handling system;
   a serial peripheral interface (SPI) read-only memory (ROM); and
   at least one logic device configured to reset the SPI ROM in response to an indication that the SPI ROM is to be reset, wherein the resetting includes:
   causing a file system associated with the SPI ROM to be dismounted;
   causing the SPI ROM to be detached from a SPI controller of the SPI ROM;
   disconnecting a power source from the SPI ROM;
   in response to a passage of a particular amount of time, reconnecting the power source to the SPI ROM;
   causing the SPI ROM to be re-attached to the SPI controller of the SPI ROM; and
   causing the file system associated with the SPI ROM to be remounted.

2. The information handling system of claim 1, wherein the management controller comprises the SPI ROM.

3. The information handling system of claim 1, wherein the resetting does not include resetting the SPI controller of the SPI ROM.

4. The information handling system of claim 1, wherein the resetting does not include resetting the at least one processor.

5. The information handling system of claim 1, wherein the logic device is a programmable logic device (PLD).

6. The information handling system of claim 1, wherein the SPI ROM does not include an input for resetting the SPI ROM.

7. A method comprising:
   receiving, at a logic device, an indication that a serial peripheral interface (SPI) read-only memory (ROM) is to be reset;
   in response to the indication, the logic device causing a file system associated with the SPI ROM to be dismounted;
   the logic device detaching the SPI ROM from a SPI controller of the SPI ROM;
   the logic device disconnecting a power source from the SPI ROM;
   the logic device waiting a particular amount of time;
   the logic device reconnecting the power source to the SPI ROM;
   the logic device re-attaching the SPI ROM to the SPI controller of the SPI ROM; and
   the logic device causing the file system associated with the SPI ROM to be remounted.

8. The method of claim 7, wherein the particular amount of time is at least 10 milliseconds.

9. The method of claim 7, wherein the method does not include resetting the SPI controller of the SPI ROM.

10. The method of claim 7, wherein the logic device is a complex programmable logic device (CPLD).

11. The method of claim 7, further comprising causing a subsequent load of data from the SPI ROM to be delayed until after the file system is remounted.

12. A read-only memory (ROM) reliability controller comprising:
    a programmable logic device (PLD) configured to be coupled to a management controller of an information handling system, the information handling system including at least one serial peripheral interface (SPI) ROM that includes a file system of the management controller, the management controller being configured to provide out-of-band management of the information handling system;
    wherein the PLD is configured to reset the SPI ROM in response to an indication that the SPI ROM is to be reset, wherein the resetting includes:
    causing the file system to be dismounted;
    detaching the SPI ROM from a SPI controller of the SPI ROM;
    disconnecting a power source from the SPI ROM;
    in response to a passage of a particular amount of time, reconnecting the power source to the SPI ROM;
    re-attaching the SPI ROM to the SPI controller of the SPI ROM; and
    causing the file system to be remounted.

13. The ROM reliability controller of claim 12, wherein the management controller comprises the SPI ROM.

14. The ROM reliability controller of claim 13, wherein the resetting does not include resetting the management controller.

15. The ROM reliability controller of claim 12, wherein the resetting does not include resetting the SPI controller of the SPI ROM.

16. The ROM reliability controller of claim 12, wherein the SPI ROM is an electrically erasable programmable ROM (EEPROM).

* * * * *